No. 788,665. PATENTED MAY 2, 1905.
R. MICHELL.
POTATO SEEDER.
APPLICATION FILED AUG. 8, 1904.
2 SHEETS—SHEET 1.
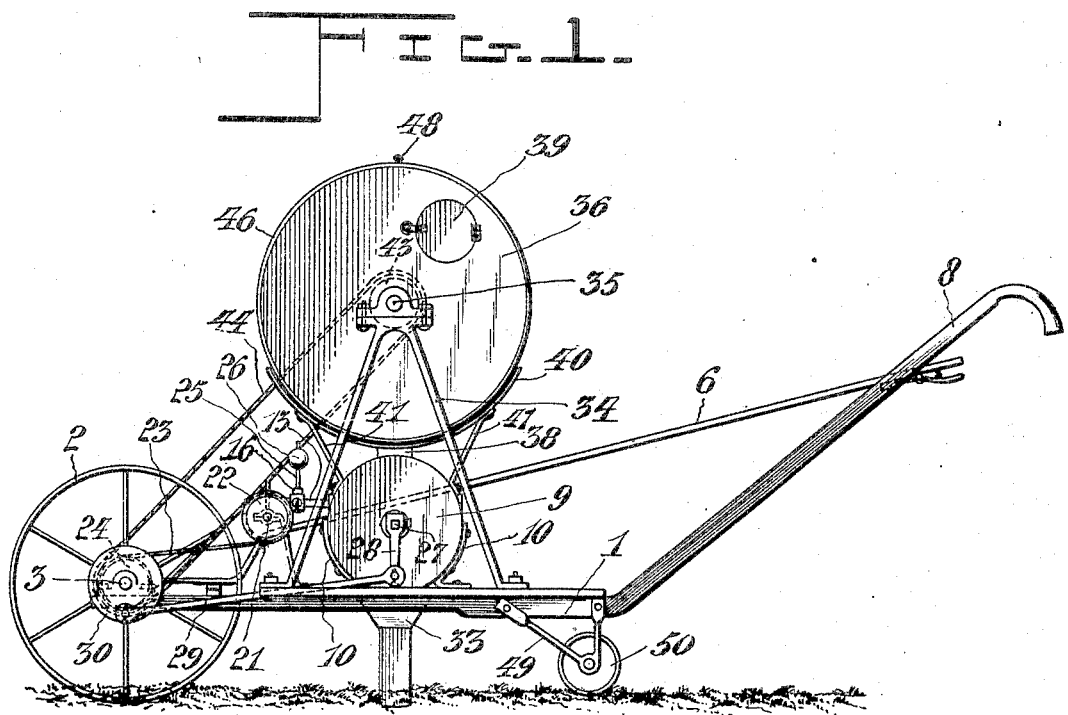
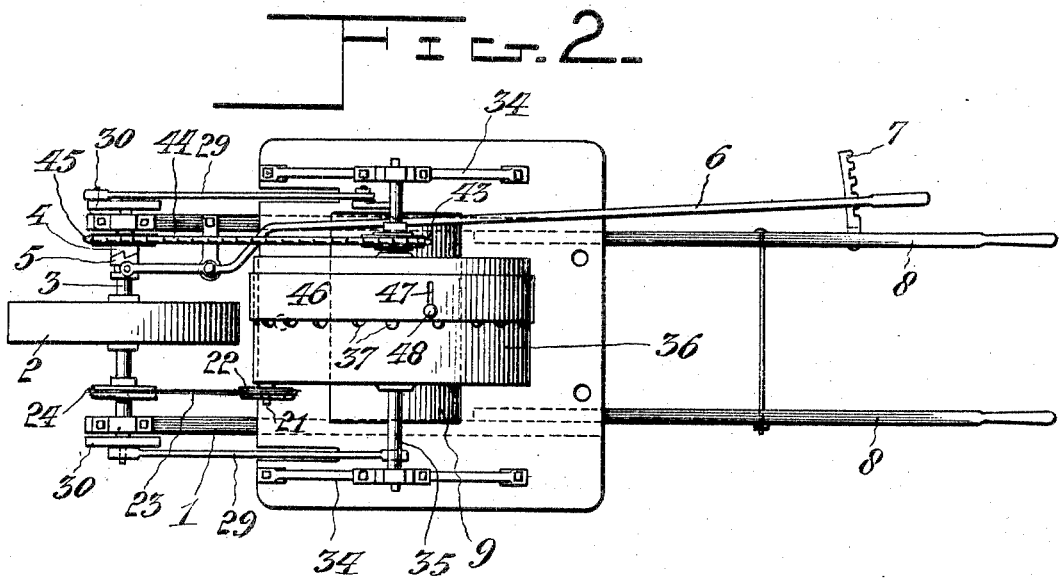
Witnesses:
Richard Michell, Inventor,
By Marion & Marion
Attorneys

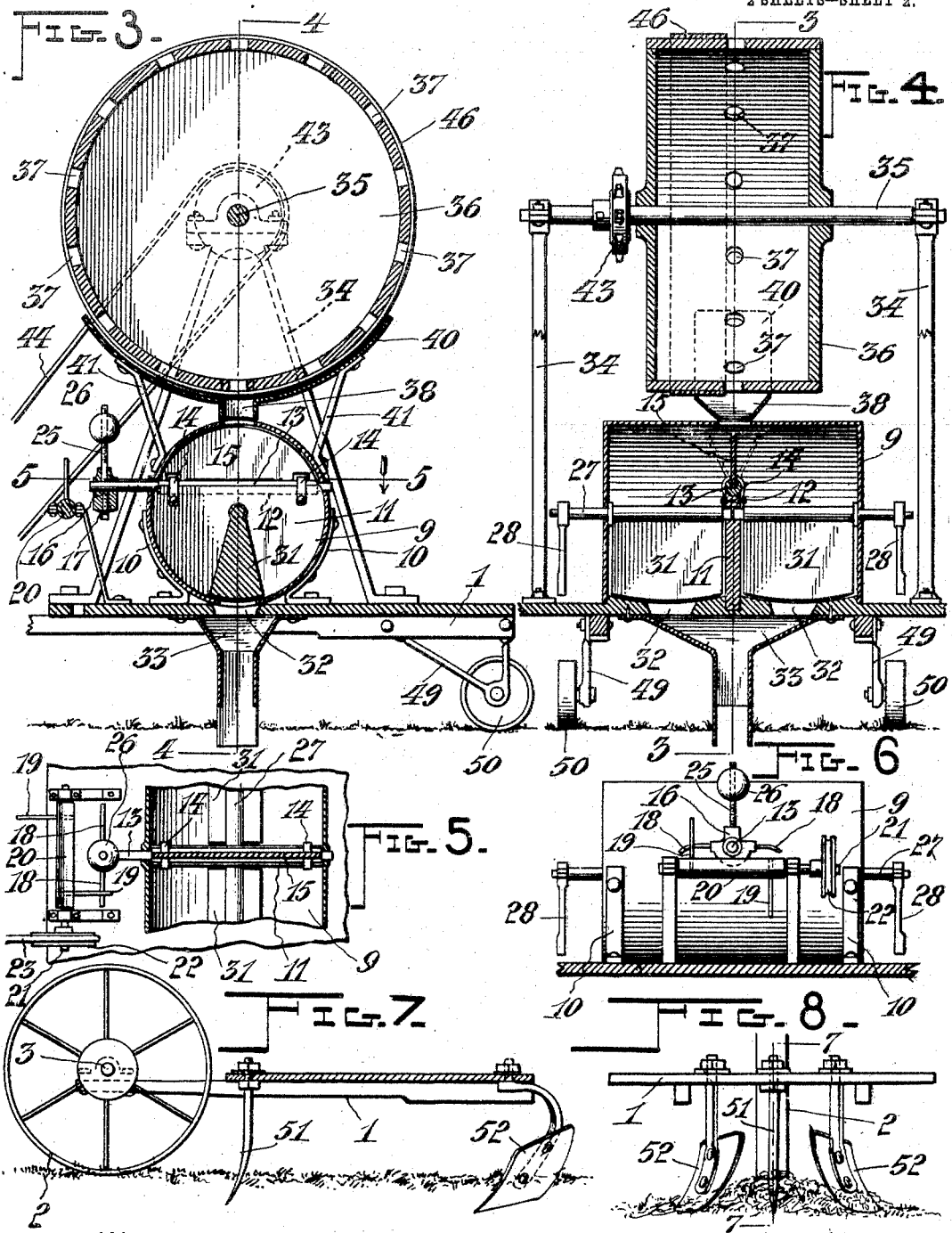

No. 788,665. Patented May 2, 1905.

UNITED STATES PATENT OFFICE.

RICHARD MICHELL, OF EAST SELKIRK, CANADA.

POTATO-SEEDER.

SPECIFICATION forming part of Letters Patent No. 788,665, dated May 2, 1905.

Application filed August 8, 1904. Serial No. 219,828.

*To all whom it may concern:*

Be it known that I, RICHARD MICHELL, a subject of the King of England, residing at East Selkirk, in the county of Lisgar, Province of Manitoba, Dominion of Canada, have invented certain new and useful Improvements in Potato-Seeders; and I do hereby declare that the following is a full, clear, and exact description of the invention, such as will enable others skilled in the art to which it appertains to make and use the same.

This invention relates to new and useful improvements in apparatus designed for use in planting potatoes; and it consists in certain features of novelty in the detail construction and operation thereof whereby a positively-operating device is provided for the purpose, which may be readily adaptable for use in planting potatoes of any character or for use in planting other vegetable products which may be adapted to the structure of the machine, as disclosed in the drawings.

The object of the invention is to provide a machine of the character described which will be simple in construction and durable in operation and which is provided with feeding mechanism which is so arranged and operated as to be positive in its operation, whereby choking or clogging of the machine is positively avoided.

In the annexed drawings, in which similar numerals of reference indicate corresponding parts in all the views, Figure 1 is a side elevational view of my improved machine ready for use, except that it is not shown provided with draft appliances, which are so well understood as not to require illustration. Fig. 2 is a top plan view of the structure disclosed in Fig. 1. Fig. 3 is a vertical sectional view taken centrally of Fig. 4 on line 3 3, as indicated in Fig. 4. Fig. 4 is a vertical sectional view taken approximately on line 4 4 of Fig. 3. Fig. 5 is a detached fragmentary detail sectional view taken on line 5 5 of Fig. 3. Fig. 6 is a front elevational view of a portion of the apparatus. Fig. 7 is a side elevational view showing the supporting-frame with its main carrying and driving wheel connected therewith, the said main frame in this instance carrying a soil-cutting blade and one of a pair of covering-plates, the view Fig. 7 being taken approximately on line 7 7 of Fig. 8; and Fig. 8 is a rear elevational view of a portion of the apparatus shown in Fig. 7.

Referring now to the parts, 1 indicates a main frame adapted to serve as a carrying-frame for the superposed actuating and feeding mechanism, the frame 1 being supported by the main driving-wheel 2 upon the shaft 3, which shaft is provided with a clutch comprising two members 4 and 5 with the member 5, there being a rod 6 connected provided with the usual detent adapted to engage with the rack 7, which projects laterally from the guiding-handle 8, as best shown in Fig. 2, whereby the feeding mechanism may be thrown in and out of actuating engagement, as may be desired. Supported upon the frame 1 is a fixed hopper 9, while braces 10 serve to lock said hopper in position upon said frame. Within the hopper 9 is a fixed partition 11, which carries at its upper edge a shaft-bearing 12, within which is held the rockable shaft 13, (best shown in Figs. 3 and 5,) upon which shaft 13 is provided securing means, as 14, between which may be locked the vertically-extending deflector-plate 15, which is shown in dotted lines in its extreme opposite positions in Fig. 4. On the end of the shaft 13 is a casting 16, pinned thereto by means of the set-screw 17, the said casting being of considerable weight below the axis of the shaft, so as to serve as a counterbalance for the said deflector 15. Projecting from the casting 16 are arms 18, which extend to opposite sides and are adapted to lie normally in the path of pins 19, carried by a cylinder or sleeve 20 upon the shaft 21, which shaft also carries a sprocket-wheel 22, in engagement with which is a chain 23, which extends thence to the sprocket 24 upon the main driving-shaft 3, so that as the said driving-shaft is rotated the sleeve 20 will be given corresponding rotation, thereby bringing the pins 19 alternately into contact with oppositely-projecting arms 18, so as to cause a rocking of said shaft 13, and thereby move the deflector 15 alternately to the position shown in dotted lines in Fig. 4. The object of this movement of said deflector will be hereinafter developed.

For the purpose of assisting in balancing the shaft 13 a rod 25, provided with a screw-thread thereon, with which engages the weight 26, is connected with the casting 16, and the weight 26 may be carried on said rod 25 nearer to or farther from the axis of the shaft 13, as may be desired. Supported within the fixed hopper 9 is a shaft 27, projecting transversely through the hopper and being provided at opposite ends with the crank-arms 28, and connected with said crank-arms 28 are rods 29, which extend forwardly and engage with the crank-disks 30, supported upon the shaft 3, the crank-arms 28 being of such length that rotation of the disks 30 will cause only rocking movement of the shaft 27 and the feed-sweeps 31, which are supported on said shafts, the said feed-sweeps passing over the feed-opening 32 from the hopper 9, which opening leads to the ground-chute 33, which conveys the seed to the ground. Supported above the hopper 9 by means of the brackets 34 and shaft 35 is a rotatable hopper 36, which hopper is provided with circumferentially-disposed openings 37, through which potatoes may pass to the chute 38, between the hopper 36 and the hopper 9, to fill the hopper 9, a feed-door 39 being provided, as best shown in Fig. 1, through which seed-potatoes may be passed into the interior of said hopper 36, the chute 38 being, as shown in Fig. 4, preferably wider at the top than at the bottom, so as to secure accuracy of feed. To prevent clogging of said chute and in addition to said enlarged opening, circumferentially-disposed flanges 40 are provided, which flanges 40 fit snugly against the rotatable hopper 36 and serve as auxiliary supporting means therefor, while brackets 41 connect said flanges 40 with the fixed hopper 9 upon the said frame 1, whereby a rigid support is provided for the said rotatable hopper. On the shaft 35 is carried the sprocket 43, in engagement with which sprocket is the chain 44, running to the sprocket 45 on the main driving-shaft 3, so that as the shaft 3 rotates a corresponding rotary movement is imparted to the hopper 36, thereby carrying the openings 37 therein alternately into coincidence with the opening through the feed-chute 38. A band 46 is provided upon the hopper 36, which may be axially and circumferentially adjusted to regulate the size of the openings 37 when desired, slots 47 being provided therein with which the pin 48 interlocks to regulate the movement of said band within predetermined limits. Connected with the frame 1 are brackets 49, within which brackets are carried supporting-rollers 50, which are preferably used when the device is used in following a plow; but where it is intended that the apparatus shall dig its own trench and cover the same the plow-point 51 may be connected with the said frame 1, as shown in Fig. 7, the brackets and rollers 49 and 50 are removed, and the cover-plates 52 be substituted therefor, it being understood that the chute projects a sufficient distance below the frame 1 to enter the ground the proper depth for planting the seed. Thus it will be seen from the drawings and the foregoing description that I have produced an apparatus for the purpose described which is simple in construction and durable in operation, the operation of which is a follows:

Potatoes being passed into the feeding-hopper 36 through the door 39 and draft being applied to the frame in any desired manner, it is guided by means of the handles 8, and when it is desired to set the apparatus in operation the lever 6 is thrown to the proper position to cause the clutch members 4 and 5 to interlock, whereupon said hopper 36 is rotated by means of the chain 44. Potatoes will pass through the opening 37 and chute 38 into the fixed hopper 9, being guided to either side of the partition 11, according to the location of the deflector 15, and pass to position in substantial coincidence with the orifice 32, leading to the chute 33, whereupon the feed-sweep 31 will project said potatoes through and into the feed-chute, through which they will pass into the ground. In the continued operation of the device the deflector 15 is moved alternately from side to side, so as to provide an approximately minimum but regular intermittent feed of potatoes to opposite sides of the partition 11, whereby the feed-sweeps 31 may act with great regularity in feeding potatoes to the chute 33 by reason of the rocking of said feed-sweeps through the crank-arm 28, rod 29, and crank-wheel 30, as before described.

While I have shown a particular construction of potato-seeder embodying the features of my invention, it will be understood that, if desired, I may make alterations in the detail construction of the same without in any manner departing from the spirit of the invention.

Having described my invention, what I claim, and desire to secure by Letters Patent, is—

1. In a potato-seeder, a perforated, rotatable hopper, a chute therefrom, a fixed hopper, a movable deflector, and rockable feed-sweeps in said fixed hopper.

2. In a potato-seeder, a perforated, rotatable hopper, a chute therefrom, a fixed hopper, a movable deflector and rockable feed-sweeps, in combination with a supporting-frame, a driving-shaft carried thereby, means for actuating said deflector and said sweeps, and soil-operating blades carried by said frame.

3. In a potato-seeder, a perforated, rotatable hopper, a chute leading therefrom, a supplemental hopper, a vertical partition in said supplemental hopper, and a movable deflector coöperating therewith.

4. In a potato-seeder, a perforated, rotatable hopper, a supplemental hopper, a chute between said hoppers, a plurality of divisional elements in said supplemental hopper, and means for moving said elements at predetermined times.

5. In a potato-seeder, a perforated, rotatable hopper, a supplemental hopper, a chute between said hoppers, a substantially vertical partition in the supplemental hopper, a movable deflector-plate extending above said partition, and a feed-sweep coöperating therewith.

6. In a potato-seeder, a hopper, a chute therefrom, a supplemental hopper therebelow, a substantially vertical partition in said supplemental hopper, a deflector above said partition, means for rocking the deflector, a plurality of rockable feed-sweeps, and means for actuating them.

7. In a potato-seeder, a supporting-frame, supporting-brackets thereon, a perforated, rotatable hopper mounted in said brackets, a supplemental, fixed hopper, a chute between said hoppers, a fixed partition in said fixed hopper, a rockable deflector, and a plurality of rockable feed-sweeps coöperating therewith.

8. In a potato-seeder, a supporting-frame, a fixed hopper carried thereby, feeding means therein, a chute leading to said hopper, said chute having extensions forming guide-bearings, a hopper provided with perforations above said bearings, and means for rotating said upper hopper.

9. In a potato-seeder, a fixed hopper, a perforated, rotary hopper, a chute therebetween, a deflector in said fixed hopper, a main driving-shaft, and means actuated therefrom for moving said deflector.

In witness whereof I have hereunto set my hand in the presence of two witnesses.

RICHARD MICHELL.

Witnesses:
 GEORGE HERBERT FOX,
 A. G. McLEOD.